United States Patent [19]
Lampe et al.
[11] Patent Number: 4,746,395
[45] Date of Patent: May 24, 1988

[54] APPARATUS FOR BONDING STACKED SHEETS TO ONE ANOTHER

[75] Inventors: Siegfried Lampe, Ellerbek; Bernd Ramcke, Hamburg, both of Fed. Rep. of Germany

[73] Assignee: E.C.H. Will (GmbH & Co.), Nedderfeld, Fed. Rep. of Germany

[21] Appl. No.: 1,006

[22] Filed: Jan. 7, 1987

[30] Foreign Application Priority Data

Jan. 17, 1986 [DE] Fed. Rep. of Germany ....... 3601187

[51] Int. Cl.⁴ ............ B32B 31/18
[52] U.S. Cl. ............ 156/524; 51/5 C; 156/153; 156/258; 156/267; 156/908
[58] Field of Search ............ 51/5 B, 5 C; 156/153, 156/258, 267, 908, 510, 524

[56] References Cited

U.S. PATENT DOCUMENTS

| | | | |
|---|---|---|---|
| 3,920,501 | 11/1975 | Carlton et al. | 156/908 X |
| 3,984,211 | 10/1976 | Hawkins | 51/5 C |
| 4,373,985 | 2/1983 | Glendening | 156/908 X |

*Primary Examiner*—Robert A. Dawson
*Attorney, Agent, or Firm*—Peter K. Kontler

[57] ABSTRACT

One edge face of each stack of overlapping paper sheets in a series of moving stacks is trimmed and simultaneously roughened by a driven circular knife before the thus trimmed and roughened edge faces are coated with adhesive paste in a step which immediately follows the combined trimming and roughening operation. The edge faces are roughened by teeth which form the cutting edge of the circular knife and/or by particles of hard metal and/or boron nitride on that major surface of the knife which confronts the edge face of the stack at the combined trimming and roughening station.

18 Claims, 2 Drawing Sheets

APPARATUS FOR BONDING STACKED SHEETS TO ONE ANOTHER

BACKGROUND OF THE INVENTION

The invention relates to apparatus for bonding portions of stacked paper sheets or the like to one another. More particularly, the invention relates to improvements in apparatus for applying adhesive paste to selected edge faces of successive stacks of overlapping sheets which consist of paper or other sheet material.

It is known to advance a succession of stacks of overlapping paper sheets along a predetermined path, to trim selected edge faces of successive stacks, to thereupon roughen the trimmed edge faces, and to ultimately apply adhesive paste to the trimmed and roughened edge faces so as to bond portions of neighboring sheets to one another and/or to allow for reliable application of flap-over covers or the like. The trimming action is performed by a driven circular knife which compacts the sheet portions adjacent the trimmed edge faces of stacks so that it is necessary to roughen the trimmed edge faces in order to ensure the application of requisite quantities of adhesive as well as sufficient penetration of adhesive into the adjacent portions of the sheets. As a rule, the means for roughening freshly trimmed edge faces of stacked sheets of paper comprises a driven milling tool which is installed at a discrete station between the trimming and adhesive applying stations with attendant increase in the bulk of the apparatus and additional cost for the milling cutter and means for journalling and driving the cutter. Moreover, the cutter removes minute articles of paper or other material which is used to make the sheets so that the apparatus and the surrounding area are contaminated unless the apparatus is equipped with complex, costly and energy-consuming dust collecting means. The dust cannot be readily recycled so that the corresponding percentage of the material of the stacks is lost.

OBJECTS AND SUMMARY OF THE INVENTION

An object of the invention is to provide a novel and improved apparatus for treating selected edge faces of successive stacks of overlapping paper sheets or the like in a small area and without excessive generation of dust.

Another object of the invention is to provide apparatus which can operate in such a way that each and every portion of a freshly trimmed edge face is properly and predictably roughened before it reaches the adhesive applying station.

A further object of the invention is to provide an apparatus which can ensure predictable trimming and roughening and highly satisfactory application of adhesive to edge faces of stacks which are transported at an elevated speed.

Still another object of the invention is to construct and assemble the apparatus in such a way that its space requirements are a fraction of those of conventional apparatus as well as that it comprises a relatively small number of parts which do not tend to generate large quantities of dust.

A further object of the invention is to provide the apparatus with a novel and improved trimming device and with a novel and improved roughening device.

An additional object of the invention is to provide an apparatus which operates in such a way that the material which is trimmed off successive stacks can be recycled in its entirety and that the trimming and/or roughening device need not be confined in or combined with expensive dust collecting equipment.

A further object of the invention is to provide novel and improved means for roughening trimmed edge faces of stacks of paper sheets and the like.

Another object of the invention is to provide a novel and improved rotary cutter for use in the above outlined apparatus.

The invention resides in the provision of an apparatus for bonding together sheets along one edge face of each of a series of stacks of overlapping sheets. The apparatus comprises means for transporting the stacks of the series along a predetermined path (e.g., along a substantially horizontal path), means for trimming the one edge face of each stack of the series in a first portion of the path including a rotary knife having means for roughening the one edge face of each of the series of stacks in the course of the trimming operation, and means for applying adhesive to the trimmed and roughened edge face of each stack of the series in a second portion of the path.

The roughening means can comprise teeth on the cutting edge of a circular knife and/or projections or protuberances provided on that major surface of a substantially disc-shaped rotary trimming knife which confronts the edge face of the stack in the first portion of the path. Such protuberances can be formed by grains of applied boron nitride or a hard metal.

The trimming means further comprises a counterknife. The rotary knife and the counterknife are disposed at opposite sides of the first portion of the path, and the counterknife is preferably provided with a substantially cylindrical peripheral surface which cooperates with the circular cutting edge of the knife to trim the one edge face of each stack of the series. The counterknife is preferably further provided with a circumferentially extending shoulder which projects substantially radially inwardly from the peripheral surface and can serve to deflect the material which is trimmed off the stack in the first portion of the path by the circular cutting edge of the knife so that the trimmed off material is not carried by stacks toward the adhesive applying means.

If the knife resembles or constitutes a circular saw, each of its teeth preferably comprises a substantially radially extending front flank and an outwardly and forwardly sloping rear flank (as considered in the direction of rotation of the knife).

The knife is preferably driven at such a speed that its peripheral speed is several times (e.g., between 15 and 20 times) the speed of forward movement of stacks past the combined trimming and roughening station.

As mentioned above, the step of applying adhesive to the roughened edge faces of successive stacks is preferably the first treatment to which the roughened edge faces are subjected downstream of the first portion of the path, i.e., the adhesive applying means is first to treat the trimmed edge faces of stacks which leave the combined trimming and roughening station. The first and second portions of the path can be closely adjacent each other to reduce the dimensions of the apparatus.

The apparatus can comprise guide means adjacent the counterknife to guide the stack in the first portion of the path adjacent the one edge face of such stack. The guide means can comprise a straight portion upstream as well as a straight portion downstream of the first portion of the path. Such guide means can comprise one or more elongated straight rails each having a first portion ahead of the first portion of the path and a second portion starting immediately or closely behind the first portion of the path and extending toward and along the second portion of the path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
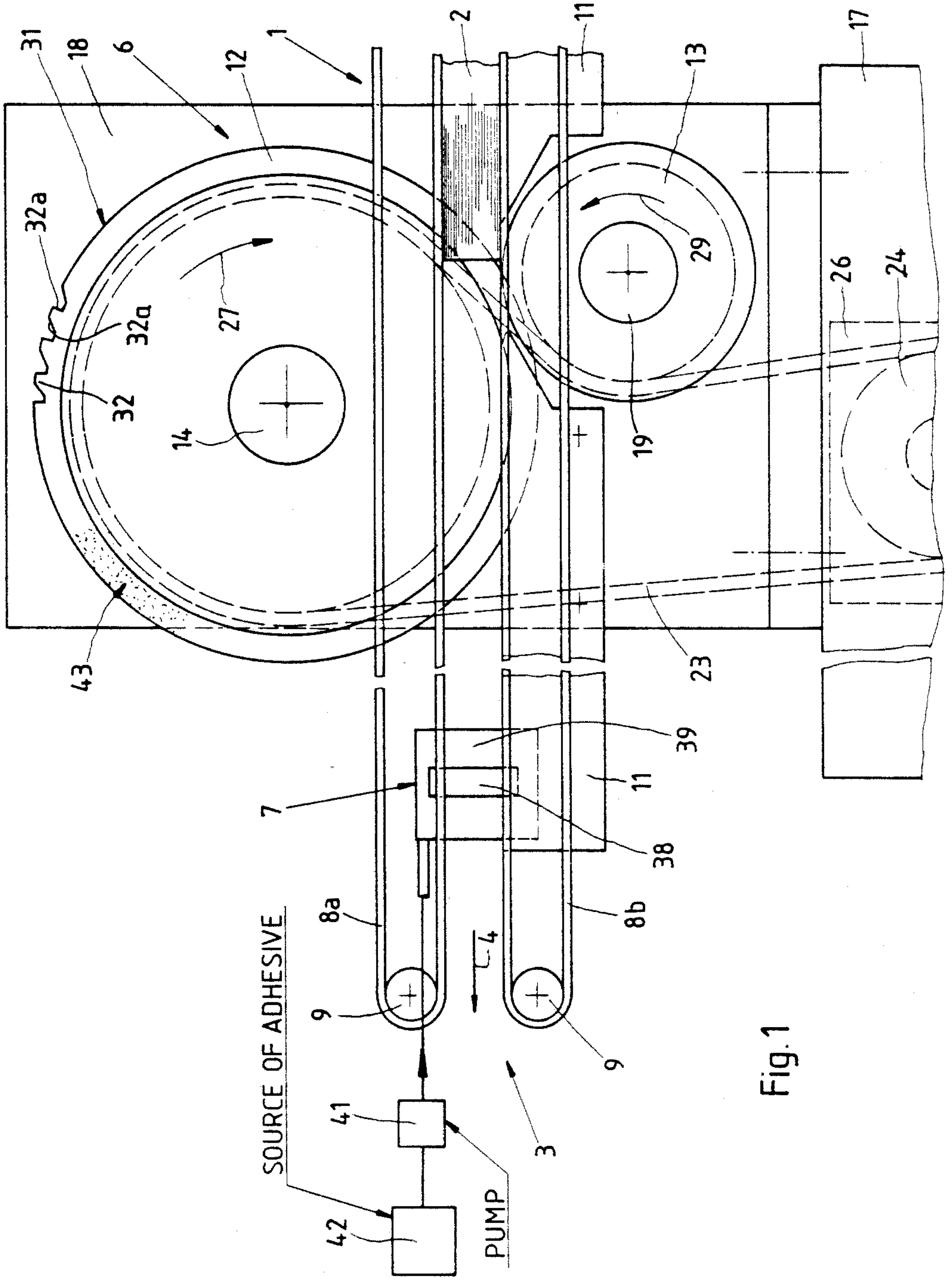
FIG. 1 is a fragmentary schematic elevational view of an apparatus which embodies one form of the invention.

FIG. 1 shows an apparatus which is used to bond selected portions of stacked sheets to one another. The sheets form a series of stacks 2 which are transported along an elongated straight horizontal path 3 by a transporting unit 1 which includes an endless belt conveyor 8 having a set of upper endless belts *8a* and a set of lower endless belts *8b*. The direction in which the stacks 2 are advanced is indicated by arrow 4. Each stack 2 can be assembled of a predetermined number of sheets made from paper or another sheet-like material. For example, each stack 2 can be converted into a memo pad wherein one marginal portion of each sheet adheres to the neighboring marginal portion of the adjacent sheet or sheets. Also, each stack 2 can comprise a rear cover of cardboard or other material.

The apparatus further comprises a combined trimming and roughening device 6 which is adjacent a first portion of the path 3, and an adhesive applying device 7 which is adjacent a second portion of the path 3 immediately or closely downstream of the first portion. The belts *8a* and *8b* of the belt conveyor 8 can extend beyond the station for the adhesive applying device 7 so as to deliver stacks 2 with adhesive-coated edge faces 33 to a further conveyor for transport to storage, to a wrapping and packing station or to another destination. The belts *8a*, *8b* are trained over pulleys 9 which form part of means for driving the transporting unit 1 at a preselected speed, preferably at one of several different speeds. FIG. 1 merely shows one pulley 9 for each of the two sets of belts *8a* and *8b*. Suitable guide means 11 is provided to properly support the stacks 2 adjacent their trimmed and roughened edge faces 33 during travel of stacks past the combined trimming and roughening device 6 and on their way toward and even beyond the adhesive applying device 7. The guide means 11 preferably comprises one or more elongated rails which are parallel to neighboring reaches of the belts *8a* and *8b*.

The combined trimming and roughening device 6 comprises a rotary circular disc-shaped knife 12 which is disposed above the path 3 and a rotary counterknife 13 which is disposed at a level below the path 3 opposite the knife 12. The knife 12 is secured to a horizontal shaft 14 rotatable in antifriction bearings *16a* which are installed in a housing 16. The housing 16 is mounted in an upright frame member 18 forming part of or secured to a main frame or support 17. The counterknife 13 is mounted on a horizontal shaft 19 rotatable in bearings *21a* which are mounted in a housing 21. The housing 21 is also mounted in or on the frame member 18.

The means for rotating the shaft 14 of the knife 12 at a selected speed includes a toothed pulley 22 which is secured to the shaft 14 and is driven by an endless toothed belt 23. The latter is further trained over a toothed pulley 28 on the horizontal shaft 19 for the counterknife 13 and over a toothed pulley 24 on the output shaft of a variable-speed motor 26 in or on the support 17. The directions in which the shafts 12 and 19 are driven are respectively denoted by arrows 27 and 29. The knife 12 and the counterknife 13 rotate in opposite directions.

The cutting edge 31 of the knife 12 is provided with an annulus of teeth 32 which constitute a means for roughening the edge face 33 of a stack 2 in that portion of the path 3 which is adjacent the knife 12 and counterknife 13. Each tooth 32 has a steep (substantially radially extending) front flank *32a* and a forwardly and outwardly sloping rear flank *32b* (as considered in the direction of arrow 27). The teeth 32 need not necessarily extend laterally, i.e., they may be disposed in a common plane which extends exactly at right angles to the axis of the shaft 12. The teeth 32 roughen the edge face 33 of the trimmed stack 2 and open up the material of the sheets so that such material can readily absorb requisite quantities of adhesive which is applied at 7. It has been found that such roughening (which takes place simultaneously with trimming) of the edge faces 33 of stacks 2 ensures a highly reliable bonding to neighboring sheets of a stack 2 to each other and/or to a flap-over cover (not shown).

Figure 2:
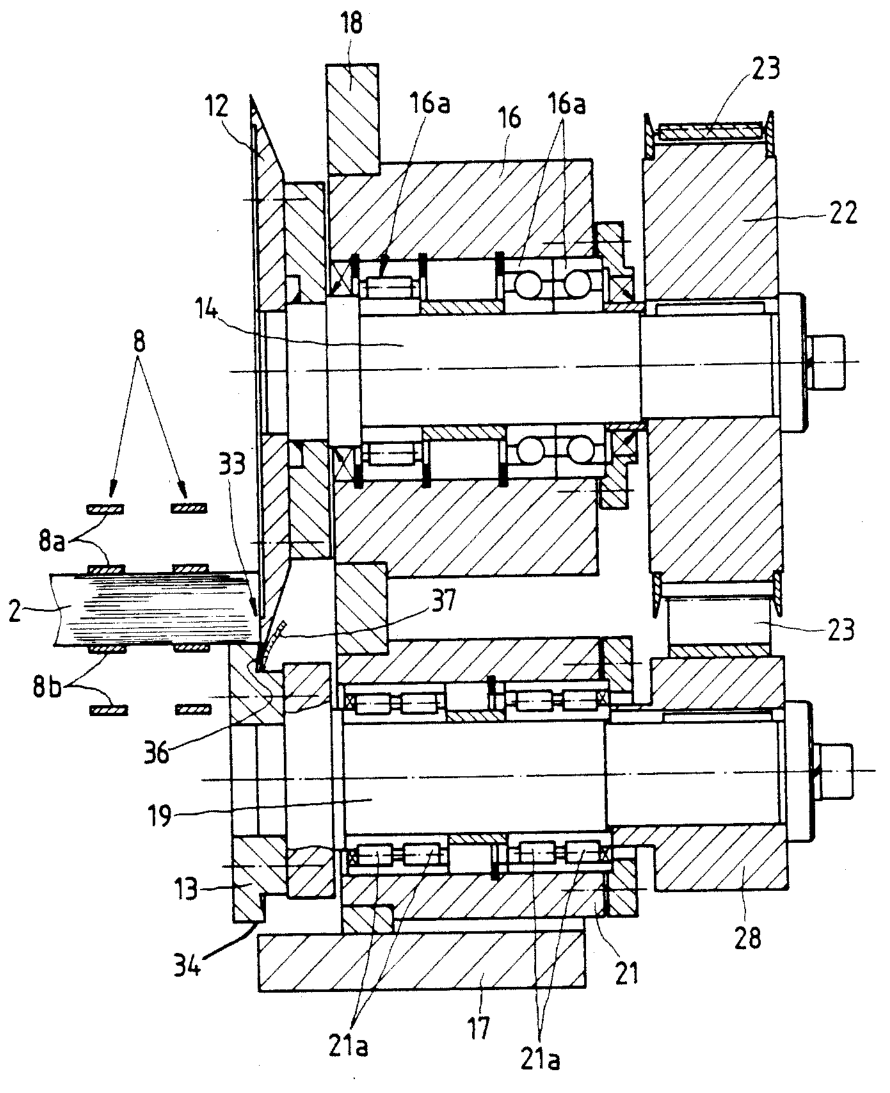
FIG. 2 is a transverse vertical sectional view of the means for trimming and roughening selected edge faces of successive stacks in the apparatus of FIG. 1.

The counterknife 13 has a substantially cylindrical peripheral surface 34 which cooperates with the cutting edge 31 of the knife 12 to remove from the adjacent edge face of a stack 2 at a layer 37 of material while, at the same time, the teeth 32 of the cutting edge 31 roughen the thus obtained trimmed or straightened out edge face 33 of the stack 2 which is transported past the station for the device 6. The periphery of the counterknife 13 is slightly undercut adjacent the left-hand end of the cylindrical surface 34 (as seen in FIG. 2) so as to enhance the penetration of the cutting edge 31 through the stack 2 between the edge face 33 and the separated layer 37. The undercut is shown at 36 and causes the counterknife 13 to exhibit a radially inwardly extending shoulder which serves to deflect the separated material layer 37 so as to ensure that such layer is not entrained toward the path portion for the adhesive applicator 7 and does not interfere with the application of a requisite quantity of adhesive paste to the entire trimmed and roughened edge face 33. The layers 37 can be fully recycled. Also, the device 6 does not cause the material of the stacks 2 to develop any appreciable quantities of dust which could contaminate the apparatus and the area therearound.

The speed at which the pulley 24 is driven by the motor 26 is preferably such that the peripheral speed of the knife 12 is several times (particularly 15–20 times) higher than the speed of translatory movement of stacks 2 along the path 3. This ensures predictable trimming as well as satisfactory roughening of edge faces 33 of successive stacks 2.

The adhesive applicator 7 of the improved apparatus comprises a roller 38 which is driven to rotate about a vertical axis and is coated with a film of adhesive paste which is transferred onto the trimmed and roughened edge faces 33 of successive stacks 2. The roller 38 is mounted in a casing 39 and the exact manner in which it receives adhesive from a suitable source of supply 42 by way of a pump 41 (both shown schematically in the left-hand portion of FIG. 1) forms no part of the present invention. Reference may be had, for example, to commonly owned German Offenlegungsschrift No. 34 20 875. The pump 41 draws adhesive paste from the source 42 and delivers it into the casing 39.

Stacks 2 which advance beyond the adhesive applying device 7 are transported to storage, to a packing station or to another destination in a manner not forming part of the invention.

It is further within the purview of the invention to roughen the edge faces 33 of successive stacks 2 in a different way or in two or more different ways, e.g., in a manner (by teeth 32) as described above and by providing that part of the major surface of the knife 12 which is adjacent the cutting edge 31 and confronts the edge face 33 at the station for the device 7 with a coarse layer or coating 43 of particles of boron nitride and/or a hard metal so that the particles constitute projections or protuberances which automatically roughen the adjacent portion of the edge face 33 during travel of the respective stack 2 between the knife 12 and the counterknife 13. It is further possible to dispense with the coating 43 and to roughen the surface of the knife 12 so that the material of the knife roughens the edge faces 33 of successive stacks 2.

An advantage of the improved method and apparatus is that the roughening of selected edge faces 33 of the stacks 2 need not be carried out at a discrete station. This contributes to simplicity, compactness and lower cost of the apparatus. Furthermore, the roughening action by the circular knife 12 is effective and highly predictable, not only as concerns the opening of the material of sheets which form the stacks 2 but also as concerns the uniformity of the roughening and material loosening action across the entire edge face 33 of each stack 2. Roughening of the edge faces 33 does not interfere with the trimming operation which is carried out in such a way that the removed material can be fully recycled and that the quantity of dust is nil or negligible. The bonding action of adhesive which is applied by the device 7 is satisfactory because the roughening is uniform across the entire edge face 33 of each stack 2. The guide rail or rails 11 ensure predictable and accurate guidance of stacks 2 during travel past the adhesive applying device 7 and/or the combined trimming and roughening device 6.

The teeth 32 constitutes a presently preferred means for roughening the edge faces 33 of successive stacks 2 at the station for the knife 12 and counterknife 13 because they do not generate appreciable quantities of dust and cooperate with the undercut shoulder 36 of the counterknife 13 to remove strips 37 which can be readily transported to recycling means without contaminating the apparatus.

The counterknife 13 and the guide means 11 are optional but advantageous features of the improved apparatus because they ensure the making of satisfactory cuts and also because they ensure proper guidance and propping of stacks 2 during travel between the knife 12 and counterknife 13.

The transporting unit 1 can be replaced with different transporting units which receive stacks 2 from a conveyor or by hand. All that counts is to ensure predictable transport and guidance of stacks 2 during travel along the path 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for bonding together sheets along one edge face of each of a series of stacks of overlapping sheets, comprising means for transporting the stacks of the series along a predetermined path; means for trimming the one edge face of each stack of the series in a first portion of the path, including a rotary knife having a cutting edge and means for roughening the one edge face of each of the series of stacks in the course of the trimming operation, said roughening means comprising teeth in said cutting edge; and means for applying adhesive to the roughened and trimmed edge face of each stack of the series in a second portion of the path.

2. Apparatus for bonding together sheets along one edge face of each of a series of stacks of overlapping sheets, comprising means for transporting the stacks of the series along a predetermined path; means for trimming one edge face of each stack of the series in a first portion of the path, including a rotary knife having means for roughening the one edge face of each of the series of stacks in the course of the trimming operation, said trimming means further including a counterknife and said knife and said counterknife being disposed at opposite sides of the first portion of said path; and means for applying adhesive to the roughened and trimmed edge face of each stack of the series in a second portion of said path.

3. Apparatus for bonding together sheets along one edge face of each of a series of stacks of overlapping sheets, comprising means for transporting the stacks of the series along a predetermined path; means for trimming the one edge face of each stack of the series in a first portion of the path, including a rotary knife having a circular cutting edge and means for roughening the one edge face of each of the series of stacks in the course of the trimming operation, said roughening means comprising a set of teeth provided in said cutting edge and extending substantially radially of the knife; and means for applying adhesive to the roughened and trimmed edge face of each stack of the series in a second portion of the path.

4. Apparatus for bonding together sheets along one edge face of each of a series of stacks of overlapping sheets, comprising means for transporting the stacks of the series along a predetermined path; means for trimming the one edge face of each stack of the series in a first portion of the path, including a rotary knife having means for roughening the one edge face of each of the series of stacks in the course of the trimming operation, said trimming means further including a counterknife and said knife and said counterknife being disposed at opposite sides of said path; guide means adjacent said counterknife and arranged to guide the stack in the first portion of said path adjacent the one edge face of such stack; and means for applying adhesive to the roughened and trimmed edge face of each stack of the series in a second portion of the path.

5. The apparatus of claim 2, wherein said knife has a cutting edge and said roughening means comprises teeth in said cutting edge.

6. The apparatus of claim 1, wherein said knife has a major surface confronting the edge face of the stack in the first portion of said path, said roughening means further comprising protuberances on said major surface of said knife.

7. The apparatus of claim 1, wherein said trimming means further comprises a counterknife, said knife and said counterknife being disposed at opposite sides of the first portion of said path.

8. The apparatus of claim 2, wherein said counterknife has a substantially cylindrical peripheral surface and said knife has a circular cutting edge cooperating with said peripheral surface to trim the one edge face of each stack of said series.

9. The apparatus of claim 8, wherein said counterknife further comprises a circumferentially extending shoulder projecting substantially radially inwardly from said peripheral surface to deflect the material which is trimmed off the stack in the first portion of the path by the cutting edge of said knife.

10. The apparatus of claim 4, wherein said knife has a circular cutting edge and said roughening means comprises a set of teeth provided in said cutting edge and extending substantially radially of the knife.

11. The apparatus of claim 3, further comprising means for rotating said knife in a predetermined direction, each of said teeth having a substantially radially extending front flank and an outwardly and forwardly sloping rear flank as seen in said predetermined direction.

12. The apparatus of claim 1, further comprising means for driving said transporting means at a first speed and means for rotating said knife at a peripheral speed which is several times said first speed.

13. The apparatus of claim 12, wherein said peripheral speed is 15-20 times said first speed.

14. The apparatus of claim 1, wherein said adhesive applying means is first to treat the trimmed edge faces of stacks which leave said first portion of said path.

15. The apparatus of claim 14, wherein said first and second portions of said path are closely adjacent each other.

16. The apparatus of claim 1, wherein said transporting means comprises a first set of endless belts adjacent one side of the stack in said first portion of said path and a second set of endless belts adjacent the other side of the stack in said first portion of said path.

17. The apparatus of claim 1, wherein said trimming means further comprises a counterknife, said knife and said counterknife being disposed at opposite sides of said path and further comprising guide means adjacent said counterknife and arranged to guide the stack in the first portion of said path adjacent the one edge face of such stack.

18. The apparatus of claim 4, wherein said guide means comprises a straight portion ahead and a straight portion downstream of the first portion of said path.

* * * * *